Figure 1:
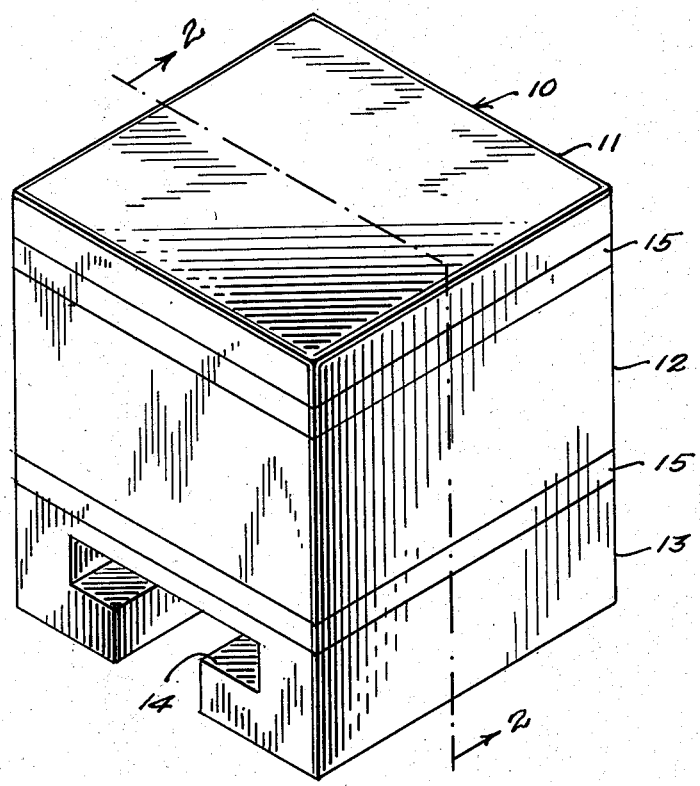

Oct. 13, 1959

C. BLISS ET AL 2,908,157

COMPOSITE FIREBRICK

Filed Oct. 30, 1953

HIGH GRADE FIREBRICK
BONDING MATERIAL
HEAT INSULATION FIREBRICK
BONDING MATERIAL
HIGH GRADE FIREBRICK

INVENTORS
CHARLES BLISS
ALBERT C. FAATZ, JR.
BY
ATTORNEY

United States Patent Office 2,908,157
Patented Oct. 13, 1959

2,908,157

COMPOSITE FIREBRICK

Charles Bliss, Ardsley, N.Y., and Albert C. Faatz, Jr., Montclair, N.J., assignors to Foster Wheeler Corporation, New York, N.Y., a corporation of New York Application October 30, 1953, Serial No. 389,244

4 Claims. (Cl. 72—36)

The present invention relates to refractory walls and more particularly to a brick for said walls.

In some furnaces the refractory walls are directly exposed to the heat of the fire, so that the temperature of such refractory walls is raised to an extremely high degree. In other furnaces, the temperatures in the furnace chamber are extremely high which consequently cause high temperatures to exist in the refractory walls. A maximum amount of heat radiation will then be obtained between the aforementioned refractory walls and the heat absorbing surfaces in the furnace. Since high-grade refractory firebrick withstands a high temperature, the furnace wall is generally made of such brick. By high-grade refractory firebrick, we mean a dense heavy refractory having high strength under high temperature but poor insulating properties. For example, in steam generators, bare refractory walls are made of high-grade firebrick because such furnaces usually have high furnace chamber temperatures. On the other hand, in some oil heaters, exposed walls consist also of high-grade firebrick because direct flame impingement thereon produces extremely high refractory temperatures.

Other applications of high firebrick result whenever the brick must have a relatively high resistance to flame erosion, or possess high mechanical strength at high temperature.

A major disadvantage of the use of this high-grade fire-brick in a furnace wall is that the high surface temperature of the firebrick which exists on the furnace side produces a high temperature in the metal supports which support the refractory wall. Hence, more expensive alloy materials which are not affected by extremely high temperatures must be used in such refractory-wall supports. To overcome this difficulty, refractory walls consisting of lightweight insulating firebrick have been used. By lightweight insulating firebrick we mean a light porous refractory having a low strength under high temperature but good insulating properties.

A major disadvantage of light-weight insulating firebrick is that it cannot withstand the erosive effects of the flames on the brick surface due to the porous nature of the bricks. Also, the cutouts necessary in the firebrick to adapt it to the wall support members are generally weak because of the low mechanical strength of this type firebrick, even at relatively low temperatures.

In accordance with the present invention, a composite refractory wall firebrick is provided having a mechanically-strong and flame-resistant, high-grade refractory inner portion, a light-weight, insulating refractory middle portion having good insulation properties, and another mechanically-strong, high-grade refractory outer portion with cutouts therein for securing support members thereto.

Figure 2:
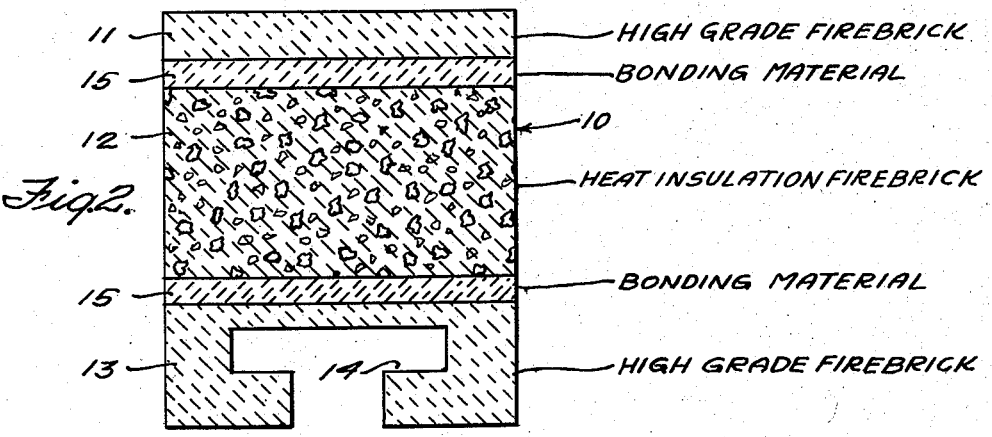

The invention will be understood from the following description when considered in connection with the following drawings forming a part thereof and in which:

Fig. 1 is an isometric view of the composite refractory wall firebrick embodied in the present invention; and Fig. 2 is a sectional view taken on line 2—2 of Fig. 1.

Referring to the drawings, the reference character 10 designates a composite refractory wall firebrick having a narrow, furnace-facing inner section 11, a wide middle or transition section 12, and a relatively narrow outer section 13. Sections 11 and 13 of the firebrick are made of high-grade refractory material such as dense, heavy refractory which material is resistant to flame erosion, is mechanically strong, and withstands a high surface temperature, as for example, fireclay mix or other well-known material in the art possessing these properties. Section 12 of the firebrick is made of light-weight refractory material such as a porous refractory weighing approximately one-third as much as high-grade refractory, and having rather low strength but high-insulation properties, as for example, fire-clay mix to which is added sawdust or similar well known materials used in the art. Outer section 13 of the firebrick is provided with a T-shaped cutout or slot 14 extending therethrough to secure it to the support member, not shown, that holds the bricks in position in a refractory wall made of firebricks. A coating or strip of bonding material 15 is provided between the faces of middle section 12 and the faces of inner and outer sections 11 and 13, respectively, so that the component sections of the single firebrick will be joined together when made of different materials not possessing adhesive characteristics with respect to one another.

The bricks of the present invention are formed into a furnace wall by mounting the bricks by their cutouts to support members which fit or engage with the particular shapes of the cutout provided in the brick until the support members are covered and the wall is completed.

With the present invention, a composite firebrick is provided having: (1) A furnace-facing section of high-grade firebrick capable of withstanding high temperature while being resistant to flame erosion; (2) a middle section, insulating refractory-wall support members from an excessive temperature; and (3) a mechanically-strong outer section with cutouts therein for support members which support the firebrick in a furnace wall.

Inasmuch as various changes may be made in the particular form, location, and arrangement of parts of the apparatus disclosed and in the steps of the process and other sequences as disclosed without departing from the principles of the invention, it will be understood that the invention should not be limited excepting by the scope of the appended claims.

What is claimed is:

1. A unitary composite firebrick for use in a furnace comprising a middle portion of insulating material, a high-grade refractory portion on one side of and contiguous to said middle portion and facing the furnace, a second high-grade refractory portion on the opposite side of and contiguous to said middle portion, said second high-grade refractory portion being of substantial thickness to provide sufficient body for a cutout means therein for securing the firebrick to a support.

2. A unitary composite firebrick for use in a furnace, comprising a middle portion of insulating material, a high grade refractory portion on one side of and contiguous to said middle portion and facing the furnace, a second high grade refractory portion on the opposite side of and contiguous to said middle portion, said second refractory portion being of substantial thickness to provide sufficient body for a T-shape cutout therein for securing the firebrick to a support.

3. A unitary composite firebrick for use in a furnace comprising a middle portion of insulating material, a high-grade refractory portion on one side of said middle portion and facing the furnace, a coating of bonding material between said middle and refractory portion, a second high-grade refractory portion on the opposite side of said middle portion, another coating of bonding material between said second and middle portions, said second high-grade refractory portion being of substantial thickness to provide sufficient body for a cutout means in said second refractory portion for securing the firebrick to a support.

4. A unitary composite firebrick for use in a furnace, comprising a fireclay and sawdust middle portion, a fireclay portion on one side of said middle portion and facing the furnace, a coating of bonding material between said middle and fireclay portions, a second fireclay portion on the opposite side of said middle portion, another coating of bonding material between said middle and second fireclay portions, said second fireclay portion being of substantial thickness to provide sufficient body for a T-shape cutout therein for securing the firebrick to a support.

References Cited in the file of this patent

UNITED STATES PATENTS

| | | |
|---|---|---|
| 1,309,296 | Marks | July 8, 1919 |
| 1,430,027 | Plantings | Sept. 26, 1922 |
| 1,448,684 | Beecher et al. | Mar. 13, 1923 |
| 1,666,284 | Gilchrist | Apr. 17, 1928 |
| 1,709,035 | Payne | Apr. 16, 1929 |
| 2,043,249 | Jones | June 9, 1936 |
| 2,242,434 | Norton | May 20, 1941 |
| 2,270,297 | Hensel | Jan. 20, 1942 |